(12) United States Patent
Neviani

(10) Patent No.: US 6,921,091 B2
(45) Date of Patent: Jul. 26, 2005

(54) SEALING BELLOWS, TRANSMISSION JOINT EQUIPPED WITH SAME AND METHOD FOR FIXING SAME

(75) Inventor: Claude Neviani, Mezy-sur-Seine (FR)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/450,280

(22) PCT Filed: Dec. 13, 2001

(86) PCT No.: PCT/FR01/03985
§ 371 (c)(1), (2), (4) Date: Jun. 11, 2003

(87) PCT Pub. No.: WO02/50442
PCT Pub. Date: Jun. 27, 2002

(65) Prior Publication Data
US 2004/0036231 A1 Feb. 26, 2004

(30) Foreign Application Priority Data
Dec. 18, 2000 (FR) .............................. 00 16508

(51) Int. Cl.⁷ .............................................. F16J 15/52
(52) U.S. Cl. ...................................... 277/634; 464/175
(58) Field of Search ................................ 277/634, 635, 277/636, 637; 464/175, 173

(56) References Cited

U.S. PATENT DOCUMENTS

| | | | |
|---|---|---|---|
| 3,511,061 A | * | 5/1970 | Burckhardt ................. 464/175 |
| 3,688,523 A | * | 9/1972 | Schafer et al. ............... 464/175 |
| 4,852,891 A | * | 8/1989 | Sugiura et al. .............. 277/636 |
| 4,895,550 A | * | 1/1990 | Baker ........................ 464/175 |
| 5,002,719 A | * | 3/1991 | Shirai et al. ................. 264/537 |
| 5,251,916 A | * | 10/1993 | Martin et al. ................ 277/636 |
| 5,472,072 A | * | 12/1995 | Bumgarner ............. 188/322.12 |
| 5,562,005 A | * | 10/1996 | Boyen et al. ................. 74/18.2 |
| 5,713,107 A | | 2/1998 | Jan |
| 6,139,027 A | * | 10/2000 | Biekx ........................ 277/634 |
| 6,179,717 B1 | | 1/2001 | Schwarzler |
| 6,244,967 B1 | | 6/2001 | Takabe et al. |
| 6,322,085 B1 | * | 11/2001 | Martin et al. ............... 277/607 |
| 6,471,595 B1 | | 10/2002 | Neviani |
| 6,547,669 B1 | | 4/2003 | Neviani |

FOREIGN PATENT DOCUMENTS

| | | |
|---|---|---|
| EP | 0 440 890 A2 | 8/1991 |
| EP | 0 464 984 A1 | 1/1992 |
| EP | 0 545 629 A2 | 6/1993 |
| JP | 05 180350 | 7/1993 |

* cited by examiner

Primary Examiner—Alison K. Pickard

(57) ABSTRACT

A sealing boot intended to ensure the sealing of a transmission joint connecting two shafts. The sealing boot includes a boot body having a bead at each end to contact and seal the periphery of the shaft or an element of the joint integral with the shaft. Each bead includes a radial outer shoulder forming a transition between the bead and the boot body, and a bearing surface extending from the shoulder and adapted to receive an element for fixing the bead against the shaft or associated joint element. The bearing surface is extended without an increase in its external diameter as far as the end of the bead. The shoulder forms a stop for longitudinal positioning during the mounting of the fixing element.

14 Claims, 5 Drawing Sheets

("Prior Art")

US 6,921,091 B2

SEALING BELLOWS, TRANSMISSION JOINT EQUIPPED WITH SAME AND METHOD FOR FIXING SAME

BACKGROUND OF THE INVENTION

The present invention relates to a sealing boot intended to ensure the sealing of a transmission joint connecting two shafts, of the type comprising a boot body having a bead at each end to contact and seal the periphery of the shaft or an element of the joint integral with the shaft.

The present invention relates to a sealing boot intended to ensure the sealing of a transmission joint connecting two shafts, of the type defined in the preamble of claim 1.

This type of sealing boot is frequently to be found disposed on two shafts which are connected for example by an articulation or a homokinetic joint such as a tripod joint. These boots are made from elastomer and have concentric or helical pleats and they confine lubricant in which the articulation or the joint is immersed.

The fixing of this type of boot is effected in a known manner by the clamping of fixing elements on each of the beads of the boot, thus clamping it firmly against each of the shafts or against a part integral with each shaft. These fixing elements can be closed rings, collars, particularly with a lug, or any other appropriate element. Apart from major deterioration of the membrane of the boot, the most critical zones in terms of good sealing of the device are located at the level of the clamped contacts between the interior of the beads and the corresponding shaft.

In the case where the fixing elements are swage-crimped closed rings there is a difficulty. In effect, the operation of crimping a fixing ring on the bearing surface of the bead necessitates fitting the ring and positioning it on the bead, then swaging it in order to bring it by plastic deformation into its mounted state. The swaging of the fixing ring is then made up of a first phase of deformation of this ring so as to bring its internal surface into simple contact with the bearing surface of the bead, then a second phase of deformation of the ring in order to make it penetrate into the bead by compressing the bearing surface. In contrast to the second phase, the first deformation phase does not in any way contribute to the clamping between the bead and the corresponding shaft. However, this first phase involves a first level of plastic deformation of the fixing ring, thus increasing the risks of it deteriorating and/or rupturing during the second phase of mounting, particularly if this mounting is automated, or during subsequent stresses in operation.

SUMMARY OF THE INVENTION

An object of the invention is to prevent the drawbacks mentioned above by proposing a boot which guarantees excellent sealing and of which the mounting reduces the risks of error in positioning and of premature deterioration of the fixing elements.

This object is achieved according to the invention with a sealing boot for sealing a transmission joint connecting two shafts, the boot comprising a boot body having a bead at each end to contact and seal the periphery of the shaft or the shaft or an element of the joint integral with the shaft. Each bead includes a radial outer shoulder forming a transition between the bead and the boot body, and a bearing surface extending from the shoulder and adapted to receive an element for fixing the bead against the shaft or associated joint element. The bearing surface is extended without an increase in its external diameter as far as the end of the bead. The shoulder forms a stop for longitudinal positioning during the mounting of the fixing element.

The bead may be externally rotational and the bearing surface may be substantially cylindrical. The bearing surface may also include a circular groove. The groove can be situated at a distance from the shoulder substantially equal to the length of the internal surface of the fixing element. In this way, the groove can form a visual reference mark for longitudinal positioning during mounting of the fixing element. The boot may comprise one or several of these characteristics taken in isolation or in any combinations which are technically possible.

The invention also relates to a transmission joint having two shafts, an articulation transmission element connecting the two shafts, a sealing boot sealing the joint, and two elements for fixing the respective ends of the boot on a shaft or on an element of the joint integral with a shaft, the two fixing elements being clamped on these ends. The sealing boot includes a boot body and a bead at each end of the body. Each bead includes a radial outer shoulder forming a transition between the bead and the boot body, a bearing surface extending from the shoulder and adapted to receive an element for fixing the bead against the shaft or associated joint element. The bearing surface is extended without an increase in its external diameter as far as the end of the bead. The shoulder forms a stop for longitudinal positioning during the mounting of the fixing element. An end neck also projects radially over the bead of the boot on the outer face of each fixing element.

In the transmission joint according to an embodiment of the present invention, each fixing element can compress the associated bearing surface of the bead of the boot causing the circular groove of the bearing surface to substantially disappear. The fixing element can, for example, be a closed ring swage-crimped on the associated bead, or a pinched lug collar crimped on the associated bead.

A method for fixing a sealing boot according to the present inventio in order to form a transmission joint is also disclosed. The boot can be any one of the embodiments disclosed. The method includes mounting the two fixing elements by successive steps of fitting the fixing element on the associated end, longitudinally positioning the fixing element with respect to the associated end, and clamping the fixing element. The fixing element at rest, has an internal diameter substantially equal to the external diameter of the bearing surface of the bead.

Other characteristics of the method according to the invention include using a closed ring for the fixing element and swaging the ring by applying a uniform force on its external surface. Alternatively, the fixing element can be a lug collar and the step of clamping can comprise pinching the base of the lug.

Other characteristics of the method according to the invention include using a closed ring for the fixing element and swaging the ring by applying a uniform force on its external surface. Alternatively, the fixing element can be a lug collar and the step of clamping can comprise pinching the base of the lug.

BRIEF DESCRIPTION OF THE DRAWINGS

The invention will be better understood upon reading the following description which is given solely by way of example and with reference to the drawings, in which:

The invention will be better understood upon reading the following description which is given solely by way of example and with reference to the drawings, in which:

FIG. 3a shows the end of the boot according to the invention, the fixing element and the female element of the joint before mounting; FIG. 3b shows these elements positions with respect to one another before the clamping of the fixing element; FIG. 3c shows the final state of the end of the boot clamped on the female element of the joint;

DETAILED DESCRIPTION OF THE INVENTION

Figure 1:
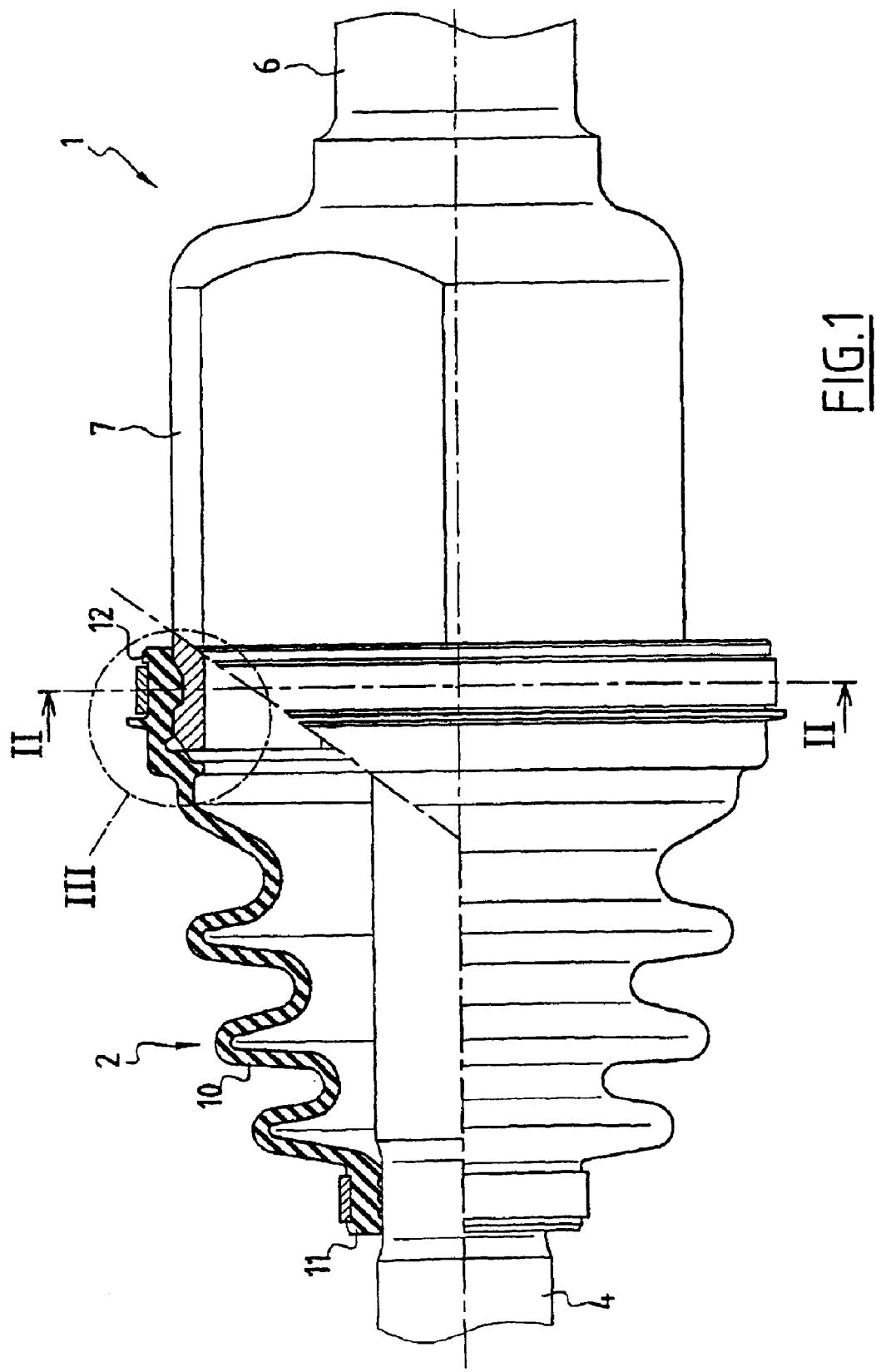
FIG. 1 shows a side view of a transmission joint according to the invention, of which the portion delimited by the axes in bold print is represented in longitudinal section.
Figure 2:
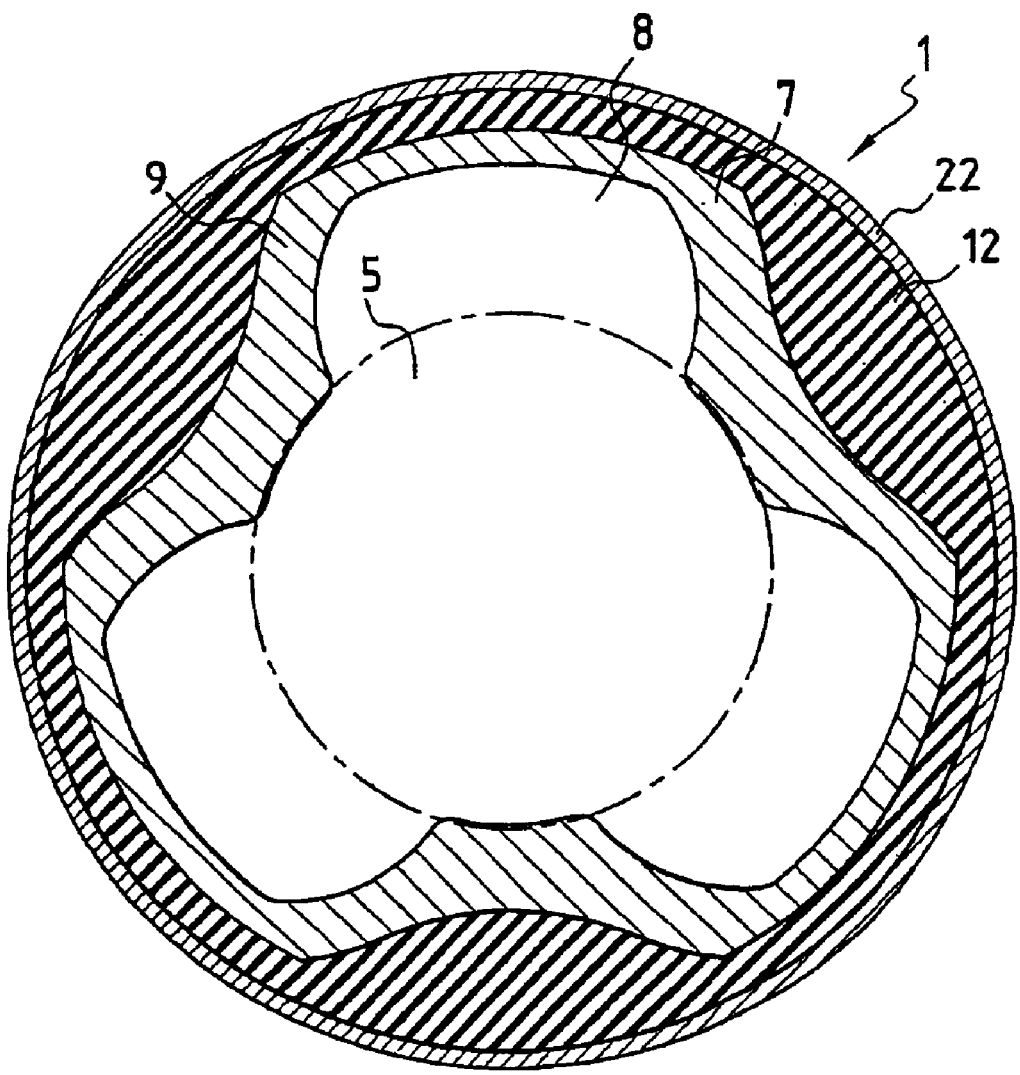
FIG. 2 shows a view in cross-section of the joint shown in FIG. 1 along the line II—II.

FIGS. 1 and 2 show a transmission joint 1 according to the invention which connects a first shaft 4 and a second shaft 6. The two shafts 4 and 6 are connected by a mechanical transmission element (not shown in detail) which necessitates good lubrication, particularly be means of grease. The confinement of the lubricant at the level of the joint is ensured by the boot 2, which is fixed at its mall end on the shaft 4 integral with male element 5 of the joint and is fixed at its large end on the periphery of a female element 7 of the joint integral with the shaft 6.

The boot comprises a boot body 10 consisting of an elastic membrane made from plastics material, with a plurality of pleats with a diameter increasing away from the shaft 4. Each of the ends of the boot takes the form of a bead 11, 12.

The internal surface of the bead 11, 12 is intended to be clamped in a sealed manner against the periphery of the associated element. In FIG. 1 the bead 11 is mounted in clamped contact on the shaft 4 and the bead 12 on the element 7.

Furthermore, in the example shown in FIG. 1 and 2, the joint is a tripod joint of which the male element 5 has three trunnions with followers 8 spaced at angles of 120° with respect to one another. The female element 7 has recesses 9, each intended to receive a roller 8. In cross-section the external profile, relative to the axis of the shaft 6, of the female element 7 is therefore three-lobed and consists of the external profiles of these recesses 9, as shown in FIG. 2. In order to ensure the sealing of the joint, the internal profile of the bead 12 has a certain number of projections directed towards the interior of the joint in such a way that it is complementary to the external profile of the female element 7 described previously. Thus in the example illustrated, the bead 12 has a three-lobed internal profile, whilst its external profile has a circular section.

Figure 3A:
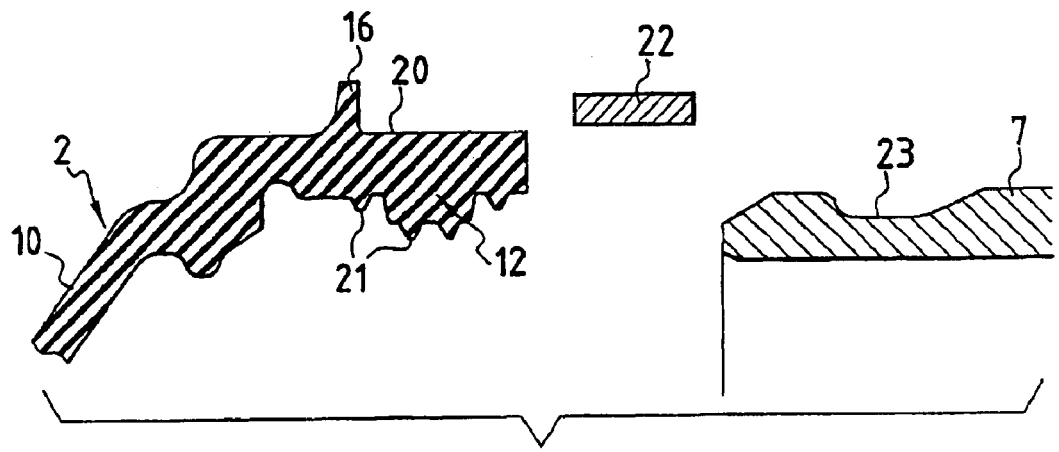
FIGS. 3a, 3b and 3c are simplified views in longitudinal section corresponding to the circled zone III in FIG. 1.

FIG. 3 shows the bead 12 of the boot 2 according to the invention, a fixing element 22 and the end of the female element 7 which is furthest inside the joint.

The bead 12 has a radially outer shoulder 16 which makes the transition between the boot body 10 and the bead 12. The bead has, from the shoulder 16 to its end, a bearing surface 20 intended to receive the fixing element 22. The bearing surface 20 is substantially cylindrical and coaxial with the bead. The internal profile in longitudinal section of the bead 12 has a plurality of substantially V-shaped projections 21 directed towards the interior of the joint. These projections 21 are intended to form sealing lines when the bead 12 is mounted and clamped against the associated element 7.

The fixing element 22 is in the form of a closed ring made from steel or from aluminium.

The external surface of the female element 7 has an annular groove 23 situated close to the end of the element 7. The profile in longitudinal section of this cavity 23 is intended to cooperate with the projections 21 of the internal profile of the bead 12 in order to form the sealing lines referred to above.

The mounting of the boot 2 consists first of all of positioning this boot on the elements 4, 7 of the joint which is to be sealed. Only the details of the mounting of the bead 12 on the female element 7 will be described below by way of example, it being understood that the mounting of the bead 11 on the shaft 4 is analogous.

Figure 3B:
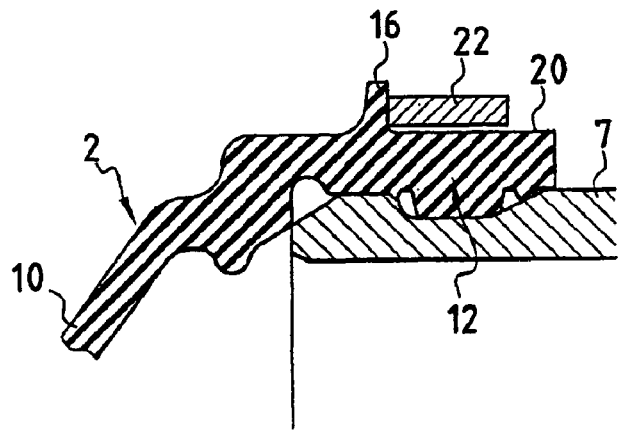

The fixing element 22 is then fitted on the bead 12 with a slight radial play and is positioned longitudinally in such a way that it is brought into a position facing the bearing surface 20, as shown in FIG. 3b, using the shoulder 16 as a positioning stop.

Figure 3C:
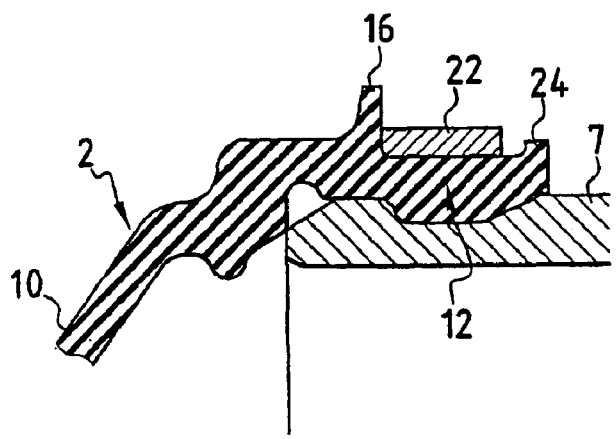

Finally, the fixing element 22 is swaged in order to compress the bearing surface 20 radially, thus applying a clamping force from the bead 12 on the associated element 7 and causing a radially projecting end neck 24 to appear at the end of the bead 12. The mounted state of the bead 12 on the element 7 is shown in FIG. 3c. In the case where a closed ring is used as the fixing element 22, the clamping consists of the application of a uniform peripheral force over the external surface of the ring. The ring, already practically in simple contact with the bead 12, is then deformed plastically by shrinkage and penetrates into the bead 12 by crimping, crushing the bearing surface 20 and causing the appearance of the end neck 24.

Figure 5:
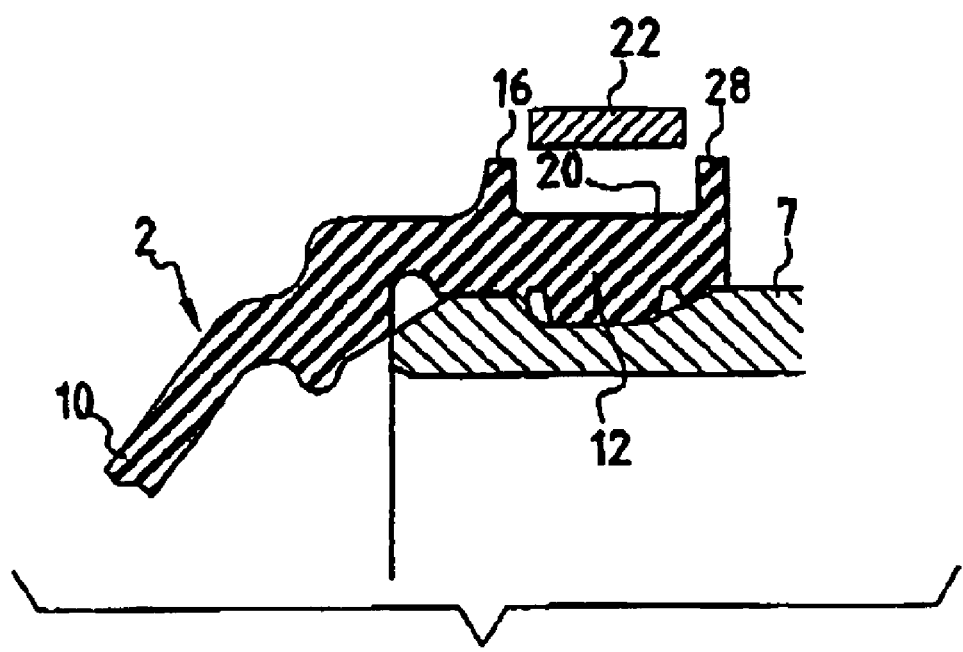
FIG. 5 is a view analogous to FIG. 3b, but in respect of a joint forming part of the prior art.

In order to aid better understanding of the invention, FIG. 5 shows a view identical to FIG. 3b but in which the boot 2 is in accordance with the prior art. The bead 12 of the boot 2 comprises the same elements as before, but it also includes in the free state an end neck 28 situated at the end of the bead 12 and extending radially towards the exterior. The mounting before clamping of such a boot as illustrated in FIG. 5 means that the fixing element 22 is fitted onto the bead, bridging the neck 28 with a slight radial play, before being positioned facing the bearing surface 20.

Since the bead of the boot according to the invention, in the free state, does not have an end neck but an end surface in an extension of the bearing surface 20, no prior deformation of the fixing element 22 is necessary at the time of mounting in order to bring it into contact with the bearing surface 20. At rest, the element 22 has an internal diameter hardly greater than the diameter of this surface 20. Also, for the same degree of clamping between the bead and the corresponding shaft, the joint 1 comprising a boot according to the invention permits a reduction in the degree of deformation of the fixing element 22, that is to say the difference between the internal diameter of the fixing element 22 in the free state and after clamped mounting, relative to joints of the same type belonging to the prior art. Consequently the reliability and the reproducibility of the clamping of the beads are improved.

Figure 4A:
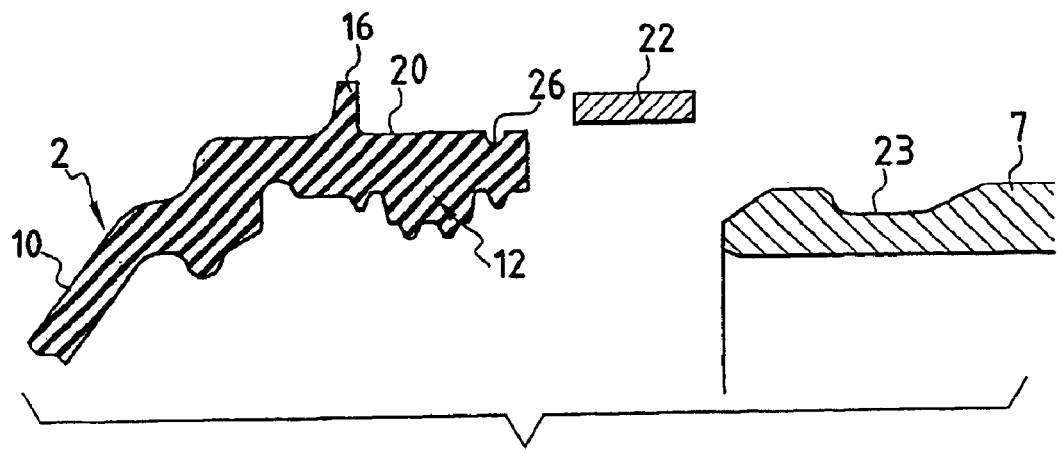
FIGS. 4a, 4b and 4c show views respectively analogous to FIGS. 3a, 3b and 3c but in respect of a joint according to a second embodiment of the invention.

FIG. 4a shows a second embodiment of the invention. The bead 12 of the boot 2 according to this embodiment comprises the same elements as the bead belonging to the first embodiment shown in FIG. 3a, namely a bearing surface 20 and a radially outer shoulder 16. However, the bearing surface 20 also includes a circular groove 26.

Figure 4B:
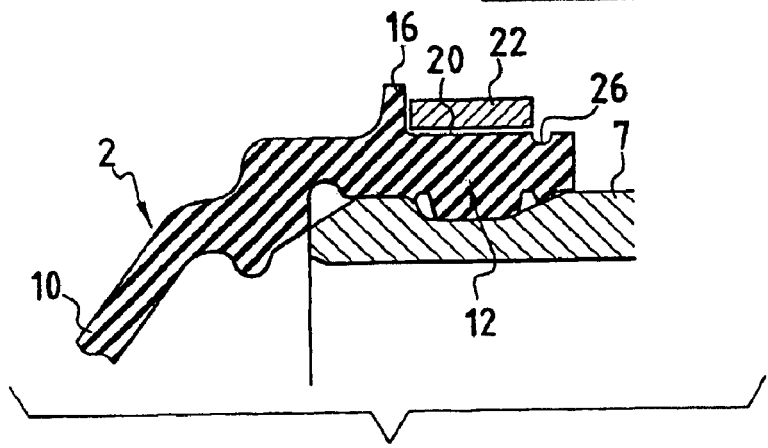

The mounting of the boot 12 according to this second embodiment is illustrated in FIG. 4b. It is identical to that of the first embodiment.

Advantageously, and as shown in FIG. 4b, the groove 26 serves as a visual reference mark for longitudinal positioning of the fixing element 22 in the case where this groove 26 is situated at a distance substantially equal to the length of the internal surface of the fixing element 22. Due to this positioning with respect to the groove 26, a slight axial play may exist between the shoulder 16 and the fixing element 28 before clamping.

Figure 4C:
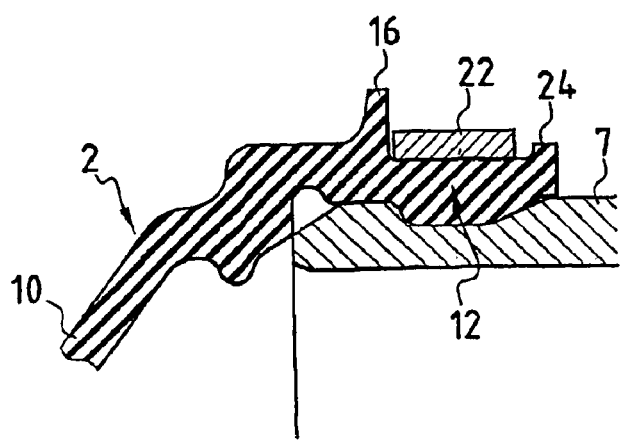

The clamping of the fixing element 22 is illustrated in FIG. 4c and is described in the same terms as in the case of FIG. 3c. The clamping of the fixing element 22 causes the appearance of an end neck 24 forming a stop whilst causing the groove 26 of the crushed bearing surface 20 to disappear partially or totally.

Thus in the two embodiments of the invention, when the fixing element 22 is mounted and clamped, the transmission joint 1 has a boot fixed in sealed contact against each of the shafts or the parts integral with the shafts, with a projecting stop on each side of the fixing element.

The presence of the circular groove 26 also permits a more homogeneous distribution of the fixing stresses within the bead during the compression of the volume of material situated below the bearing surface 20 crushed by the fixing element 22.

It may be noted that the profile in cross-section of the external surface of the bead 12 is not limited to a circular profile but may have projections directed towards the exterior, particularly facing the recesses of the female element 7, in order for the clamped bead to have a substantially constant material thickness over all of its section. The ring 22 then has a corresponding non-circular profile at rest. Thus the clamping pressure is distributed in a more homogeneous manner within the material which makes up the bead.

As a variant, the closed ring can be replaced by a lug collar as fixing element 22. The clamping then consists of the application of a pinching force at the level of the base of the lug with which such a collar is conventionally provided, already practically in simple contact with the bead 12. The pinching of the lug leads to the reduction of the internal diameter of the collar, which penetrates into the bead 12, causing the appearance of the end neck 24.

Finally, the invention applies to any transmission joint and not only to those which have a ternary symmetry as in the examples set out here.

What is claimed is:

1. A sealing boot for sealing a transmission joint connecting two shafts (4, 6) comprising a boot body (10) having a bead (11, 12) at each end for sealingly contacting the periphery of a shaft (4) or an element (7) of the joint integral with a shaft (6), each bead comprising:
   a radially outer shoulder (16) forming a transition between the bead (12) and the boot body (10) and adapted to form a stop for longitudinal positioning during mounting of a fixing element (22) for sealingly fixing the bead against the shaft (4) or the associated element (7), and
   a bearing surface (20) extending from the shoulder (16) without an increase in its external diameter as far as the end of the bead (11, 12) and adapted to receive the fixing element (22),
   wherein the bearing surface (20) comprises a circular groove (26), and
   wherein the groove (26) is situated at a distance from the shoulder (16) substantially equal to the length of an internal surface of the fixing element (22) and is adapted to form a visual reference mark for longitudinal positioning during mounting of the fixing element (22).

2. A sealing boot as claimed in claim 1, wherein the bead (11, 12) is externally rotational and the bearing surface (20) is substantially cylindrical.

3. A transmission joint comprising two shafts (4, 5), an articulated transmission element connecting the two shafts, a sealing boot (2) according to claim 1 for sealing of the joint, and two elements (22) for fixing the respective ends of the boot on a shaft (4) or on an element (7) of the joint integral with a shaft (6), the two fixing elements (22) being clamped on these ends, wherein upon being clamped, an end neck (24) projects radially over the bead (11, 12) of the boot on the outer face of each fixing element (22).

4. A transmission joint as claimed in claim 3, wherein each fixing element (22) compresses the associated bearing surface (20) of the bead (11, 12) of the boot (2), causing the circular groove (26) of the bearing surface (20) to disappear at least partially.

5. A transmission joint as claimed in claim 4, wherein the fixing element (22) is a closed ring swage-crimped on the associated bead (11, 12).

6. A transmission joint as claimed in claim 4, wherein the fixing element (22) is a pinched lug collar crimped on the associated bead (11, 12).

7. A transmission joint as claimed in claim 3, wherein the fixing element (22) is a closed ring swage-crimped on the associated bead (11, 12).

8. A transmission joint as claimed in claim 3, wherein the fixing element (22) is a pinched lug collar crimped on the associated bead (11, 12).

9. A method of fixing a sealing boot in order to form a transmission joint comprising two shafts (4, 6), a sealing boot (2) according to claim 1 and intended to ensure sealing of the joint, and two fixing elements (22) for fixing the respective ends of the boot on a shaft (4) or on an element (7) of the joint integral with a shaft (6), each fixing element being mounted on the corresponding end of the boot by successive steps of:
   fitting the fixing element (22) on the associated bead (11, 12),
   longitudinally positioning the fixing element (22) in abutting relationship with the shoulder (16) of the bead (11, 12), and
   clamping of the fixing element (22) on the bearing surface (20).

10. A method as claimed in claim 9, wherein the fixing element (22) is a closed ring, and wherein the clamping step comprises swaging the ring by application of a uniform force on its external surface.

11. A method as claimed in claim 9, wherein the fixing element (22) is a lug collar and wherein the clamping step comprises pinching the base of the lug.

12. A method of fixing a sealing boot in order to form a transmission joint comprising two shafts (4, 6), a sealing boot (2) according to claim 1 and intended to ensure sealing of the joint, and two fixing elements (22) for fixing the respective ends of the boot on a shaft (4) or on an element (7) of the joint integral with a shaft (6), each fixing element (22) being mounted on the corresponding end of the boot by successive steps of:
   fitting the fixing element (22) on the associated bead (11, 12), using the groove (26) of the bead as a visual reference mark for longitudinally positioning the fixing element (22) with respect to the bead (11, 12), and clamping the fixing element (22) on the bearing surface (20).

13. A boot bead (12) for a sealing boot for sealing a transmission joint connecting two shafts (4, 6), the boot comprising a boot body (10) having a bead (11, 12) at each end for sealingly contacting the periphery of a shaft (4) or an element (7) of the joint integral with a shaft (6), the bead comprising:

a radially outer shoulder (16) forming a transition between the bead (12) and the boot body (10) and adapted to form a stop for longitudinal positioning during mounting of a fixing element (22) for sealingly fixing the bead against the shaft (4) or the associated element (7), and a bearing surface (20) extending from the shoulder (16) without an increase in its external diameter as far as the end of the bead (11, 12) and adapted to receive the fixing element (22), wherein the bearing surface (20) comprises a circular groove (26), and wherein the groove (26) is situated at a distance from the shoulder (16) substantially equal to the length of an internal surface of the fixing element (22) and is adapted to form a visual reference mark for longitudinal positioning during mounting of the fixing element (22).

14. A boot bead (12) as claimed in claim 13, wherein the bead is externally rotational and the bearing surface (20) is substantially cylindrical.

* * * * *